Aug. 2, 1927.

R. CHILTON

SELF ALIGNING GEAR MOUNTING

Filed May 14, 1926

INVENTOR
ROLAND CHILTON
BY
ATTORNEY

Patented Aug. 2, 1927.

1,637,806

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

SELF-ALIGNING GEAR MOUNTING.

Application filed May 14, 1926. Serial No. 109,108.

This invention relates to self-aligning gear mountings and the primary object is to provide simple, compact and easily fabricated means for maintaining even pressure distribution across the width of gear teeth in spite of deflections of the gears or supporting housings under load. Such deflections often prevent increased strength being realized in practice from an increased tooth width, by inducing corner failure from the concentration of load at one end of the teeth. Torsional and bending deflections in long or overhung pinions and disalignment from unequal stiffness or loading of bearing supports are familiar examples, and the latter condition commonly obtains when the torque reaction from a gear housing is taken by supporting means not structurally symmetrical with the gear shaft bearings. In compound gear trains it is difficult to insure deflectional symmetry especially as the relative bearing deflections within a complex casing are difficult to estimate.

The prior art shows relatively elaborate pivoted subframes for the bearings to compensate for these minute deflections and this invention aims at providing relatively simple means for this purpose.

For the purpose of this disclosure, a gear train suitable for an engine starter is shown as illustrating the foregoing considerations in a mechanism wherein compactness, lightness and simplicity of construction are desired.

In the drawings:

Figure 3 is a section taken on the line 3—3 of Fig. 1 looking in the direction indicated by the arrows.

Figure 6 is a detail view of the cylindrical sleeve.

Figure 1:
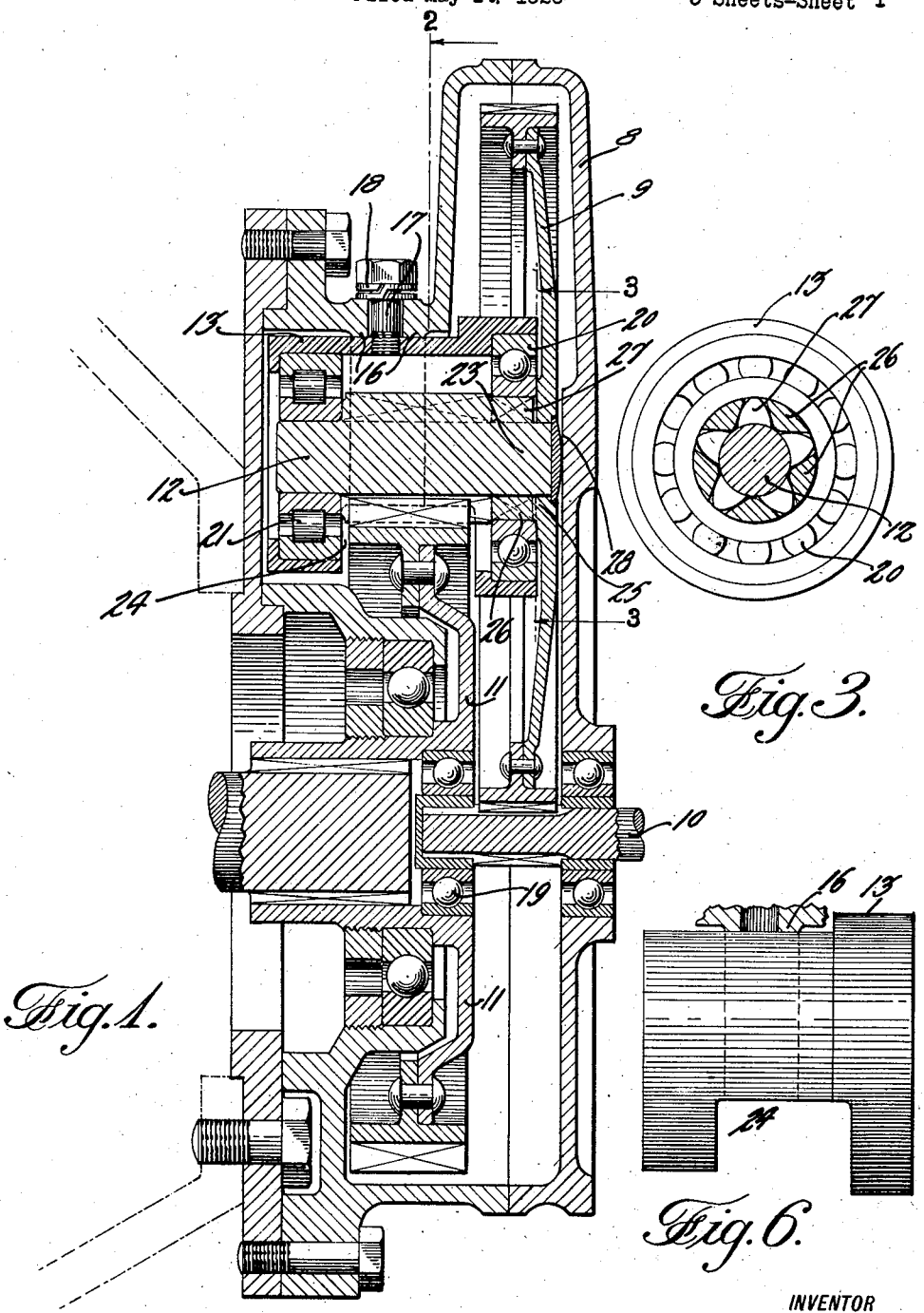
Figure 1 is a vertical section of a compound gear train embodying the present invention.
Figure 2:
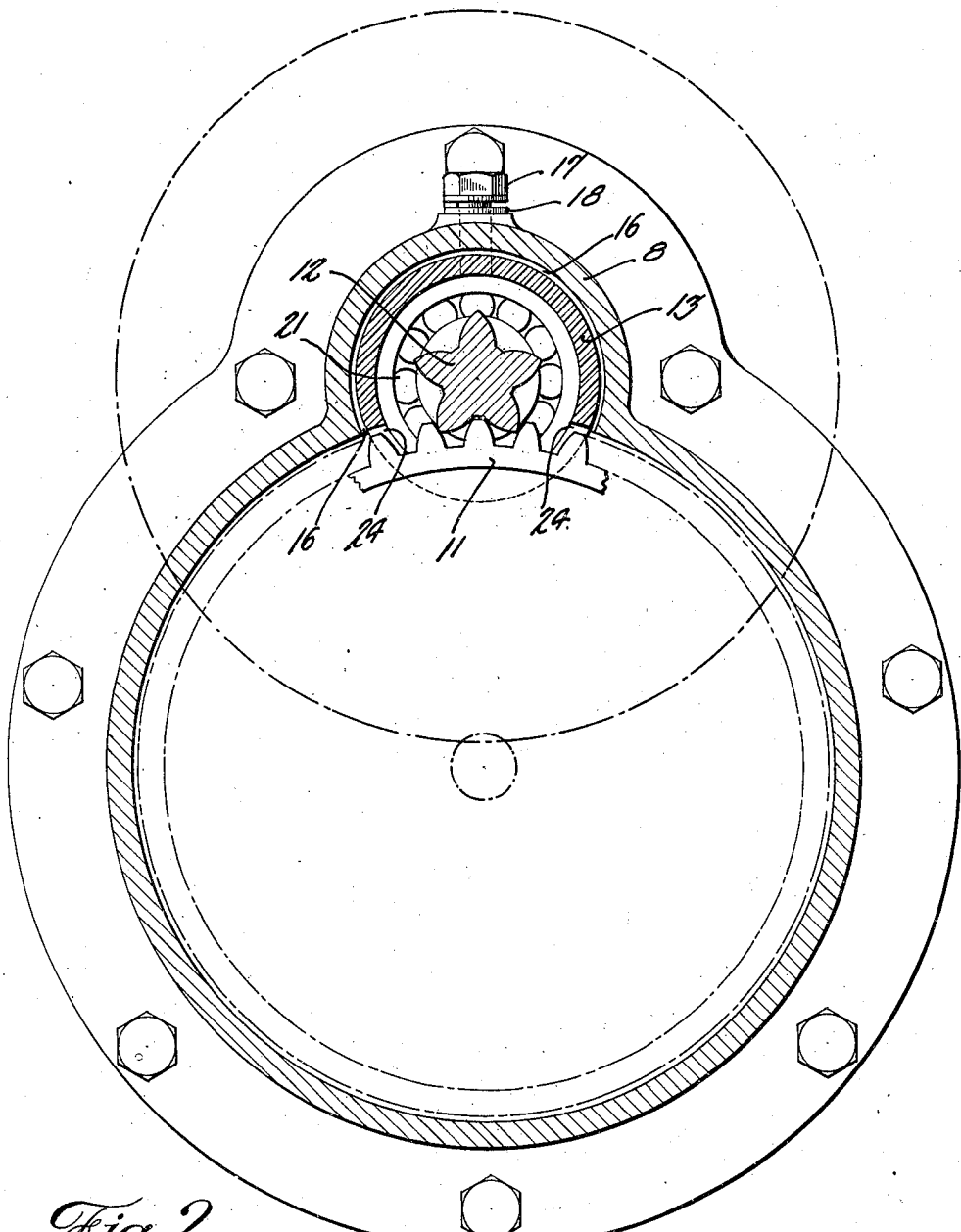
Figure 2 is a transverse section taken on the line 2 of Fig. 1 looking in the direction indicated by the arrow.

The showing illustrates a double reduction gear train, the second reduction comprising a gear 11, and a pinion 12, supported in bearings 20 and 21. The gear is preferably centrally supported on a bearing 19 directly engaged in the housing 8. Special features of this invention relate to the cylindrical sleeve 13 supporting the pinion bearings 20 and 21 and in turn supported by a relatively short abutment 16 in the housing disposed substantially opposite to the midwidth of the teeth. This abutment conveniently takes the form of a narrow rib projecting into the housing and bored to fit the outer diameter of the sleeve 13, and cut away on one side, as is the sleeve (at 24 in Fig. 6), to clear the gear 11.

The tooth loads and bearing reactions are resisted only at the relatively narrow and centrally disposed contact between the sleeve 13 and the abutment 16 whereby the tooth pressures at either end of the teeth must be in equilibrium since the sleeve acts as a centrally supported compensating lever for this purpose. Spherical or pivotally formed contact surfaces between the sleeve and the case may be used if substantial angular deflections are apprehended, but in general the more simply formed and assembled short cylindrical support shown, will be incapable of exerting subtsantial resistance to the minute tilt necessary to enable the teeth to remain in strictly parallel contact. To this end, excessive tightness in the fit of the sleeve to the casing is to be avoided.

Although the center of the sleeve 13 and its abutment 16 in the housing are partly cut away on one side to clear the gear, it will be seen that the direction of load on the pinion bearings is away from the opening 24 and tends to keep the sleeve against the uninterrupted side of the supporting surface. A locating screw 17 having a spring washer 18 may be used to locate the sleeve 13 endwise.

In the case of a double reduction gear train some reaction from the first reduction gear 9 and pinion 10 devolves upon the sleeve 13, such reaction being always proportional to the tooth loads, and equilibrium of the sleeve-carried parts is maintained by slightly offsetting the midwidth of the sleeve-supporting abutment from the center of the width of the second reduction pinion.

In addition to disturbances from deflections of its own bearings, the first reduction pinion 10 should be free to follow any angular deflection of the second reduction pinion assemblage. This freedom may be provided by a similar floating sleeve and narrow abutment as already described, but as one of the pinion bearings may be more conveniently supported from another gear shaft as in the instance of the showing, alternative self-aligning means are included in this invention.

Accordingly, the first reduction gear 9 is mounted on a lay shaft comprising the second reduction pinion 12. This gear is provided with a hub 25 having end splines 26 engaged by splines 27 conveniently comprising extensions of the pinion teeth 12. Both the top of the tooth extensions and the outer diameter of the end splines of the gear 9 are preferably fitted to the bore of the bearing 20 so that both the gear and the pinion are directly centered in the bearing which is preferably disposed midway of the width of the gear 9. A cylindrical extension 23 of the pinion shaft may be fitted to a bore in the hub splines 26, but the fitted length should be short to permit slight angularity in the plane of the gear 9 relative to the pinion to enable the teeth of the former to follow any angular deflection of the pinion 10. For the same reason end location of the gear hub 25 upon the pinion extension 23, is preferably effected only by loose contact as with a locating face 28 on the cover of the housing 8.

Figure 4:
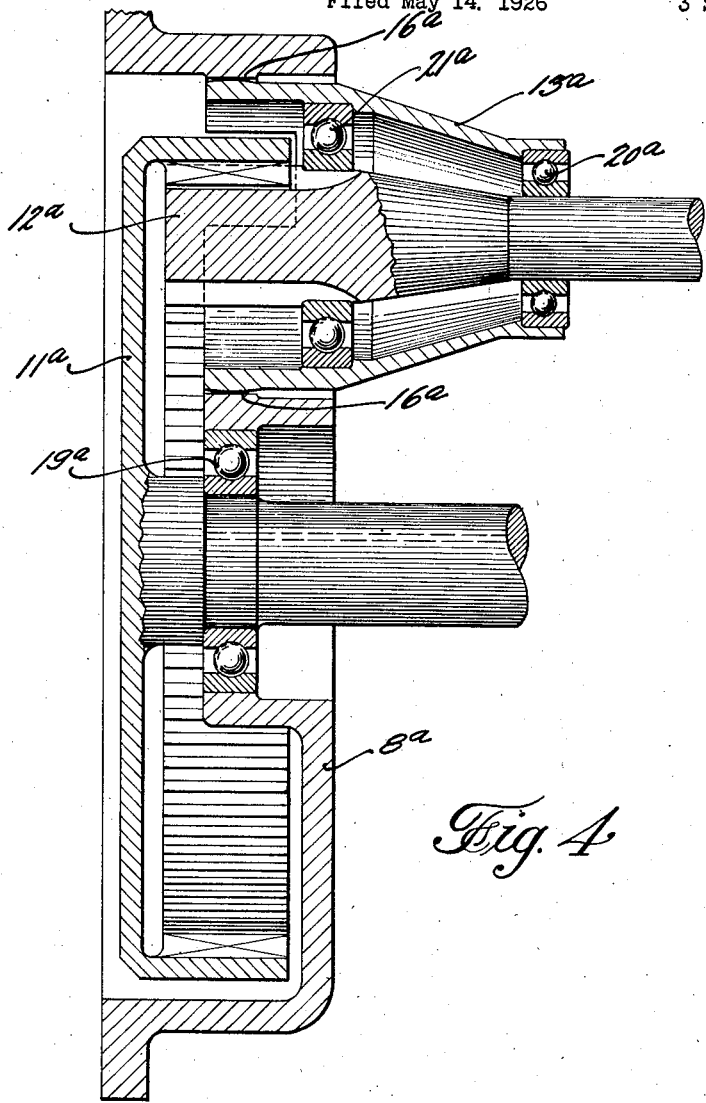
Figure 4 is a vertical section showing the application of the invention to a gear train having an overhung pinion.
Figure 5:
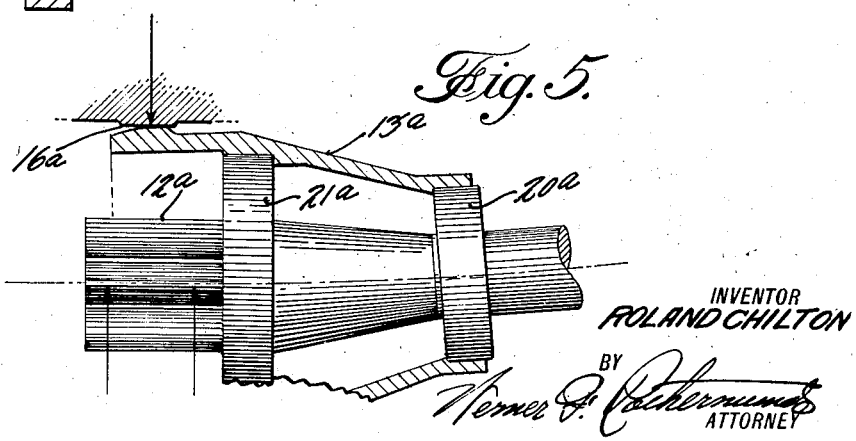
Figure 5 is a fragmentary view of Fig. 4 diagrammatically illustrating an exaggerated condition of pinion deflection.

Overhung pinions are specially subject to deflection causing detrimental concentration of load at one end of the teeth and Figs. 4 and 5 explain the application of this invention to such cases. In these figures the exponent "a" has been added to the reference numeral previously used to indicate the corresponding parts. It will be obvious from these figures that by the use of this invention the spacing of the bearings need not be symmetrical with the gear width since the sleeve will balance the gear tooth reactions against a centrally located abutment through bearings having any convenient offset or one-sided disposition, and one of the features of this invention resides in compensating the deflections which otherwise may prohibit the often more convenient overhung pinion construction. Fig. 5 shows in diagrammatic form that the pinion, sleeve, and bearing assemblage are analogous in effect to a lever bent back upon itself whereby a force applied at one end may be balanced against an abutment contacting with the other regardless of the amount of offset in the "lever" intermediate its adjacent ends.

Variations may be resorted to within the scope of the invention and portions of the improvements may be used without the others, whilst not departing from the spirit of the invention.

Having thus described my invention, I claim:

1. In apparatus of the class described, the combination of a housing, a lay shaft comprising a gear and pinion drivably connected for slight relative tilting action, bearing means for the gear disposed at the midwidth thereof, a bearing for the pinion, and a mounting sleeve for said bearings supported for slight tilting action in the housing.

2. In a gear train, the combination of a lay shaft comprising a toothed pinion mounted for slight tilting action, a gear having driving splines engaged with an end of the pinion teeth, and a bearing for the gear disposed at the midwidth thereof.

3. In a gear train, the combination of a lay shaft comprising a toothed pinion, a gear having splines engaged with an end of the pinion teeth, and a bearing for the gear disposed at the mid-width thereof and about said spline engagement.

4. In a gear train, the combination with a housing, of a gear, a pinion, means drivably connecting said gear and pinion for slight tilting action relative each other, and means for mounting both in the housing for unitary tilting action relatively thereto.

5. In a gear train, the combination of a casing having a narrow circular rib portion, a sleeve rockably supported against said rib portion, a toothed pinion having bearings engaged in said sleeve; one of said bearings being mounted on the pinion teeth, and a gear having a splined hub extending into said bearing and engaged with the pinion teeth in a manner as to permit relative axial deflection between the pinion and the gear.

6. In apparatus of the class described, the combination of a casing, a pinion, and a gear; the pinion being mounted in the casing for slight relative axial deflection thereto; the gear being mounted at one end of the pinion for rotation therewith in such a manner as to permit of slight angular deflections relative thereto.

7. In apparatus of the class described, the combination of a casing, a sleeve member mounted in the casing for slight angular deflections of its axis, bearings supported in said sleeve, a pinion mounted in said bearings, a gear having a hub drivably connected to the pinion in a manner as to permit of slight angular deflections thereof relative to said pinion; said connection being within the width of the gear.

8. In a gear train, the combination of a lay shaft comprising a toothed pinion, a gear having driving splines engaged with an end of the pinion teeth, a bearing for the gear disposed at one end of the pinion and at the mid-width of the gear, a further bearing at the other end of the pinion, a sleeve for the support of said bearings; said sleeve being mounted to permit of slight angular deflections of its axis.

9. A self aligning mounting for a gear upon a pinion shaft comprising in combination, a hub for the gear having projections thereon, projections formed on the pinion shaft and engaging the projections on the gear hub; said engagement being within the width of the gear, and a bearing fitted over said projections.

10. In a gear train, a pinion, a gear, a splined driving connection therebetween engaged within the width of the gear teeth, a casing having a circular rib portion adjacent the mid-portion of the pinion teeth and a housing having pinion bearings and engaging said rib portion.

11. A self-aligning gear mounting comprising, a pinion, a gear, a splined connection therebetween within the width of the gear face, a gear casing having a circular rib portion adjacent the mid-width of the pinion, and a rockable supporting sleeve engaged with said rib portion and having bearings for the support of the pinion, one of which engages said splined connection.

Signed at Keyport, in the county of Monmouth, and State of New Jersey this 13th day of May A. D. 1926.

ROLAND CHILTON.